United States Patent
Liao et al.

(10) Patent No.: US 11,230,349 B2
(45) Date of Patent: Jan. 25, 2022

(54) DERAILLEUR ASSEMBLY

(71) Applicant: TEKTRO TECHNOLOGY CORPORATION, Changhua County (TW)

(72) Inventors: Bo-Yi Liao, Changhua County (TW); Yu-Ming Huang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 469 days.

(21) Appl. No.: 16/372,543

(22) Filed: Apr. 2, 2019

(65) Prior Publication Data

US 2019/0300111 A1    Oct. 3, 2019

(30) Foreign Application Priority Data

Apr. 3, 2018   (TW) .................. 107204484

(51) Int. Cl.
*B62M 9/122*    (2010.01)
*B62M 9/125*    (2010.01)
*B62M 25/08*    (2006.01)

(52) U.S. Cl.
CPC ............ *B62M 9/122* (2013.01); *B62M 9/125* (2013.01); *B62M 25/08* (2013.01)

(58) Field of Classification Search
CPC ..... B62M 9/122; B62M 25/08; B62M 9/1242
USPC ..................................... 474/80, 82
See application file for complete search history.

(56) References Cited

U.S. PATENT DOCUMENTS

| | | | | |
|---|---|---|---|---|
| 5,328,414 A * | 7/1994 | Ancarani Restelli | .. | B62M 9/122 474/80 |
| 5,480,356 A * | 1/1996 | Campagnolo | .......... | B62M 9/122 280/238 |
| 6,162,140 A * | 12/2000 | Fukuda | .................. | B62M 9/122 474/70 |
| 6,623,389 B1 * | 9/2003 | Campagnolo | .......... | B62M 9/122 474/70 |
| 7,549,662 B2 * | 6/2009 | Righi | .................... | B62M 9/122 280/257 |
| 7,942,768 B2 * | 5/2011 | Takamoto | .............. | B62M 9/122 474/82 |
| 10,793,222 B1 * | 10/2020 | Harris | .................. | B62M 9/1244 |
| 2003/0207732 A1 * | 11/2003 | Fukuda | .................. | B62M 25/08 474/80 |
| 2004/0014541 A1 * | 1/2004 | Dal Pra | ................ | B62M 9/1244 474/70 |

(Continued)

*Primary Examiner* — Henry Y Liu
(74) *Attorney, Agent, or Firm* — Locke Lord LLP; Tim Tingkang Xia, Esq.

(57) ABSTRACT

The disclosure relates to a derailleur assembly including a base member, a movable member, a driving module and a power module he driving module includes a casing and a motor, wherein the casing is pivotably disposed on the base member via a first pivot shaft, the casing is pivotably disposed on the movable member via a second pivot shaft, and the motor is disposed in the casing. The power module includes a base body and a battery assembly, wherein the base body is pivotably disposed on the base member via a third pivot shaft, the base body is pivotably disposed on the movable member via a fourth pivot shaft, and the battery assembly is disposed on the base body and is electrically connected to the motor.

9 Claims, 6 Drawing Sheets

(56) References Cited

U.S. PATENT DOCUMENTS

| | | | |
|---|---|---|---|
| 2004/0102269 A1* | 5/2004 | Fukuda | B62J 45/42 474/82 |
| 2004/0116221 A1* | 6/2004 | Fukuda | B62M 9/1244 474/82 |
| 2005/0187048 A1* | 8/2005 | Fukuda | B62M 9/122 474/70 |
| 2005/0187050 A1* | 8/2005 | Fukuda | B62M 9/122 474/80 |
| 2005/0215369 A1* | 9/2005 | Fukuda | B62M 25/08 474/82 |
| 2005/0239587 A1* | 10/2005 | Ichida | B62M 9/122 474/82 |
| 2006/0183584 A1* | 8/2006 | Fukuda | B62M 25/08 474/70 |
| 2007/0191159 A1* | 8/2007 | Fukuda | B62M 9/1242 474/82 |
| 2008/0227572 A1* | 9/2008 | Sakaue | B62M 9/122 474/82 |
| 2009/0098963 A1* | 4/2009 | Watarai | B62K 23/06 474/80 |
| 2009/0209375 A1* | 8/2009 | Takamoto | B62M 25/08 474/18 |
| 2009/0215561 A1* | 8/2009 | Fukuda | B62M 9/122 474/82 |
| 2012/0149509 A1* | 6/2012 | Capogna | B62M 9/132 474/80 |
| 2012/0322591 A1* | 12/2012 | Kitamura | B62J 6/06 474/80 |
| 2013/0303317 A1* | 11/2013 | Yamaguchi | B62M 9/126 474/80 |
| 2014/0087901 A1* | 3/2014 | Shipman | B62M 9/122 474/82 |
| 2014/0155206 A1* | 6/2014 | Johnson | B62M 25/04 474/80 |
| 2014/0162817 A1* | 6/2014 | Yamaguchi | B62M 9/122 474/80 |
| 2014/0162818 A1* | 6/2014 | Yamaguchi | F16H 61/68 474/80 |
| 2014/0214285 A1* | 7/2014 | Wesling | B62J 45/414 701/51 |
| 2014/0243127 A1* | 8/2014 | Pasqua | B62M 9/122 474/80 |
| 2014/0243129 A1* | 8/2014 | Pasqua | B62M 9/1248 474/82 |
| 2014/0296009 A1* | 10/2014 | Suyama | B62M 9/122 474/80 |
| 2015/0031483 A1* | 1/2015 | Yamaguchi | B62M 9/126 474/80 |
| 2015/0111675 A1* | 4/2015 | Shipman | B62M 9/122 474/82 |
| 2016/0107723 A1* | 4/2016 | Tsai | B62M 9/122 474/69 |
| 2016/0152301 A1* | 6/2016 | Bortoli | B62M 9/124 474/82 |
| 2016/0311491 A1* | 10/2016 | Watarai | B62M 25/08 |
| 2016/0375959 A1* | 12/2016 | Calendrille, Jr. | B62M 9/1242 474/122 |
| 2017/0096185 A1* | 4/2017 | Hara | B62J 1/08 |
| 2017/0101155 A1* | 4/2017 | Tachibana | B62M 25/08 |
| 2017/0113759 A1* | 4/2017 | Watarai | B62J 43/20 |
| 2017/0120983 A1* | 5/2017 | Komatsu | B62K 25/286 |
| 2017/0197685 A1* | 7/2017 | Braedt | B62J 45/42 |
| 2018/0178881 A1* | 6/2018 | Miglioranza | B62M 9/127 |
| 2018/0229803 A1* | 8/2018 | Wesling | B62M 9/132 |
| 2018/0237104 A1* | 8/2018 | Pasqua | B62M 9/122 |
| 2018/0265169 A1* | 9/2018 | Braedt | B62M 9/126 |
| 2018/0274623 A1* | 9/2018 | Brown | B62M 9/128 |
| 2018/0281899 A1* | 10/2018 | Bernardele | B62M 9/124 |
| 2018/0354586 A1* | 12/2018 | Komatsu | B62M 25/08 |
| 2019/0023351 A1* | 1/2019 | Tsai | B62M 9/124 |
| 2019/0031287 A1* | 1/2019 | Ueda | B62M 9/132 |
| 2019/0100279 A1* | 4/2019 | Brown | B62M 9/124 |
| 2019/0100280 A1* | 4/2019 | Brown | B62M 1/36 |
| 2019/0144071 A1* | 5/2019 | Boehm | B62M 9/1248 474/80 |

\* cited by examiner

DERAILLEUR ASSEMBLY

CROSS-REFERENCE TO RELATED APPLICATIONS

This non-provisional application claims priority under 35 U.S.C. § 119(a) on Patent Application No(s). 107204484 filed in Taiwan, R.O.C. on Apr. 3, 2018, the entire contents of which are hereby incorporated by reference.

TECHNICAL FIELD

The disclosure relates to a derailleur assembly, more particularly to a derailleur assembly with a power module and driving module.

BACKGROUND

Bicycle industry gets a fast development in recent years, more and more people use the bicycle as a form of transportation and use the bicycle to race. The bicycle is often equipped with a rear derailleur that can shift the chain onto a different sized sprocket according to road condition. In addition, the electric derailleur is an increasingly popular choice due to more precise shifting and instant feedback compared to the mechanical derailleur.

The electric derailleur has to be cooperated with a battery, but the battery is conventionally disposed on or accommodated in the bicycle frame. However, disposing the battery on the bicycle frame would negatively affect the appearance of the bicycle, and the cable connected between the battery and the derailleur is arranged along the bicycle frame so that the cable is easily pulled or tangled with external object or damaged due to dust or moisture in the air. And disposing the battery inside the bicycle frame is very limited by the internal space of the bicycle frame, such that the manufacture of which is complicated and not cost-effective. Also, the above ways of disposing the battery requires a longer cable, and which will deteriorate the electricity transmission. Therefore, the above problem is an important issue to be solved in the field.

SUMMARY

One embodiment of the disclosure provides a derailleur assembly including a base member, a movable member, a driving module and a power module he driving module includes a casing and a motor, wherein the casing is pivotably disposed on the base member via a first pivot shaft, the casing is pivotably disposed on the movable member via a second pivot shaft, and the motor is disposed in the casing The power module includes a base body and a battery assembly, wherein the base body is pivotably disposed on the base member via a third pivot shaft, the base body is pivotably disposed on the movable member via a fourth pivot shaft, and the battery assembly is disposed on the base body and is electrically connected to the motor.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure. Furthermore, in order to simplify the drawings, some conventional structures and components are drawn in a simplified manner to keep the drawings clean.

Further, the following embodiments are disclosed by the figures, and some practical details are described in the following paragraphs, but the present disclosure is not limited thereto. Furthermore, for the purpose of illustration, some of the structures and components in the figures are simplified, and wires, lines or buses are omitted in some of the figures. And the size, ratio, and angle of the components in the drawings of the present disclosure may be exaggerated for illustrative purposes, but the present disclosure is not limited thereto, and various modifications are allowed and can be made according to the following disclosure as long as it does not depart from the spirit of the present disclosure. Note that the actual size and designs of the product manufactured based on the present disclosure may also be modified according to any actual requirements.

Further, the terms, such as "end", "portion", "part", "area" and the like may be used in the following to describe specific components and structures or specific features thereon or therebetween but are not intended to limit these components and structures. In the following, it may use terms, such as "substantially", "approximately" or "about"; when these terms are used in combination with size, concentration, temperature or other physical or chemical properties or characteristics, they are used to express that, the deviation existing in the upper and/or lower limits of the range of these properties or characteristics or the acceptable tolerances caused by the manufacturing tolerances or analysis process, would still able to achieve the desired effect.

Furthermore, unless otherwise defined, all the terms used in the disclosure, including technical and scientific terms, have their ordinary meanings that can be understood by those skilled in the art. Moreover, the definitions of the above terms are to be interpreted as being consistent with the technical fields related to the disclosure. Unless specifically defined, these terms are not to be construed as too idealistic or formal meanings. The terms of the components in the disclosure are sometimes referred to in a more concise manner, depending on the requirements of the description, and should be understood by the reader.

Figure 1:
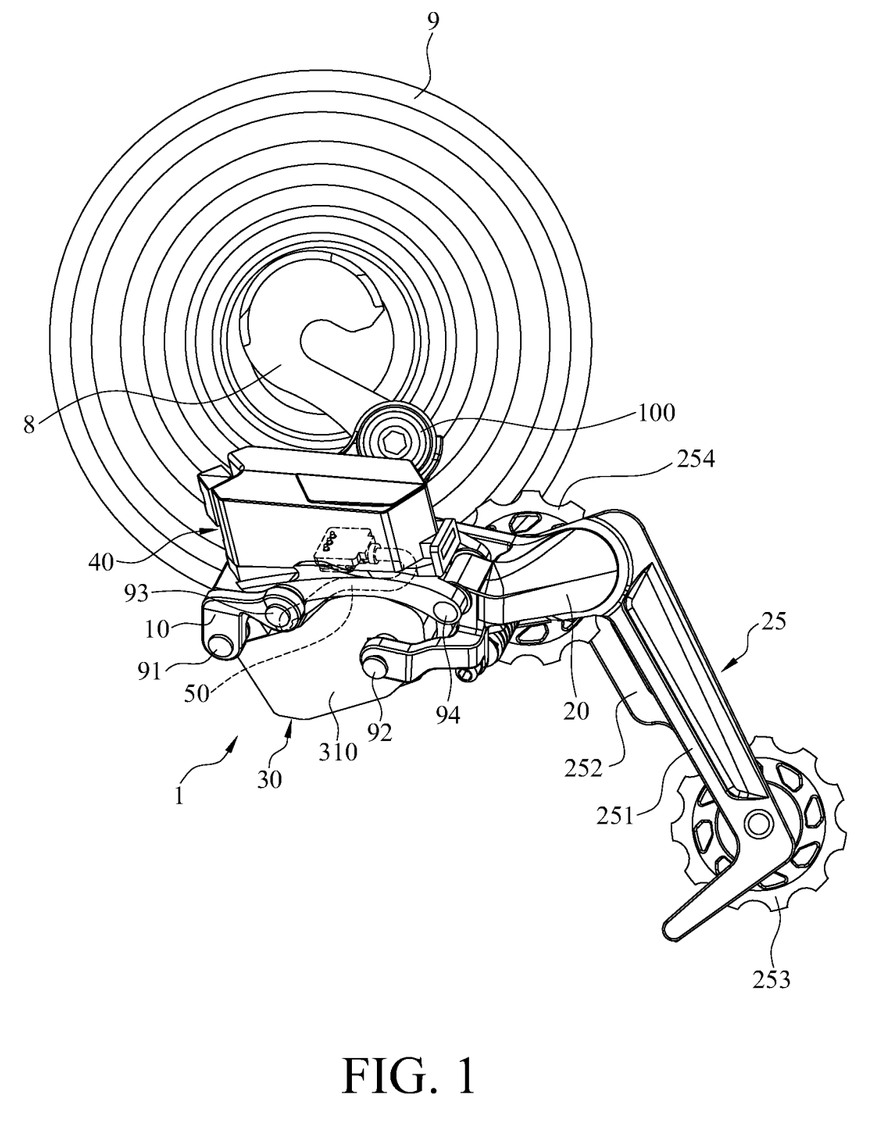
FIG. 1 is a perspective view of a derailleur assembly, frame, and sprockets according to a first embodiment of the disclosure.
Figure 2:
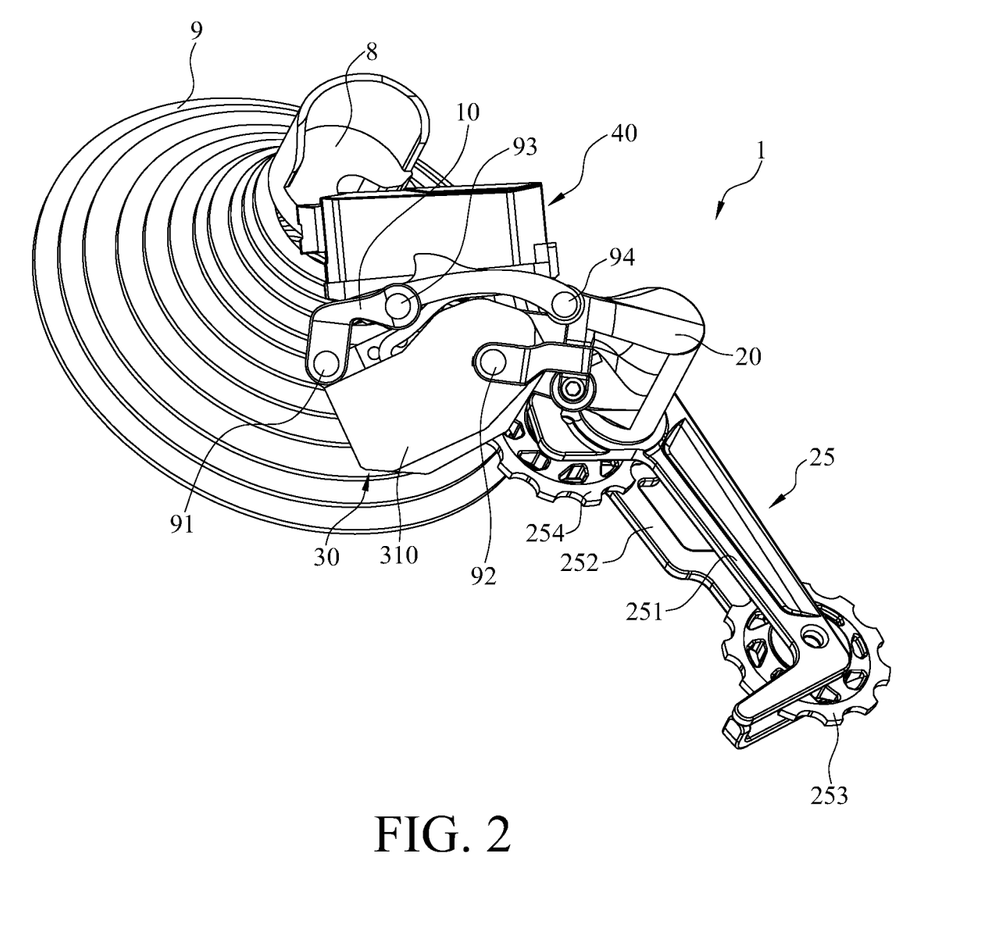
FIG. 2 is another perspective view of FIG. 1.
Figure 3:
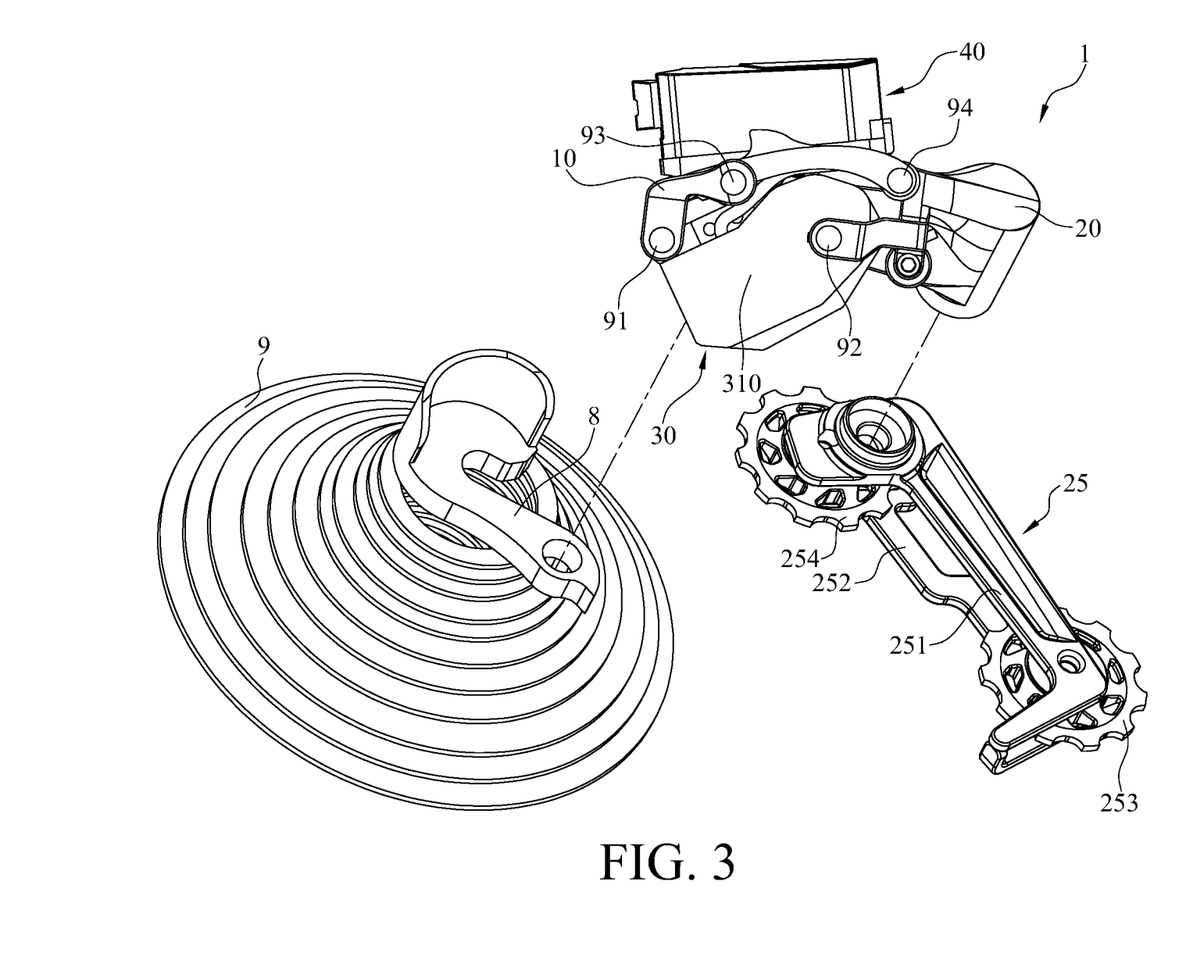
FIG. 3 is an exploded view of FIG. 2.
Figure 4:
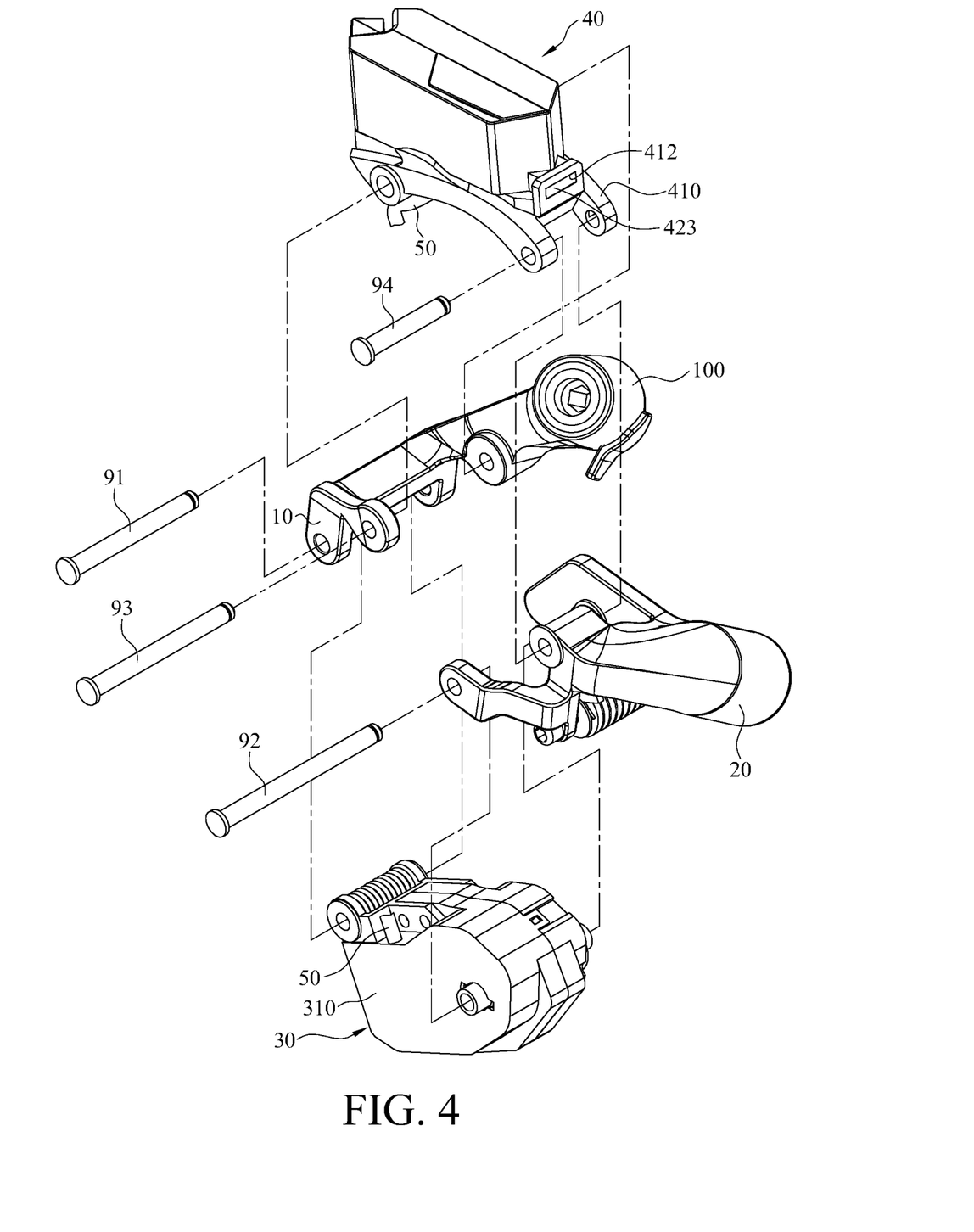
FIGS. 4 and 5 are exploded view of the derailleur assembly of the first embodiment.
Figure 5:
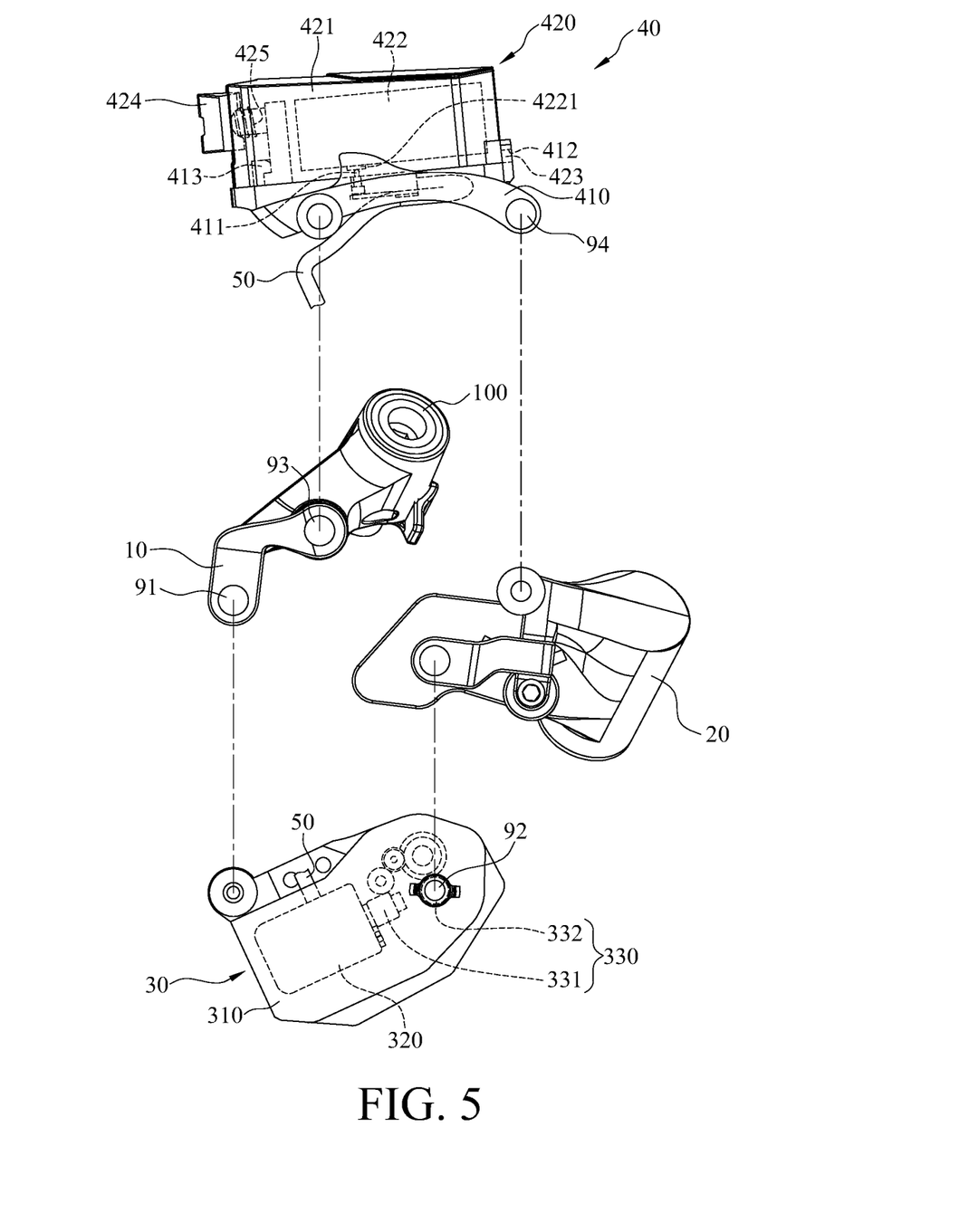

Please refer to FIG. 1 to FIG. 5, FIG. 1 is a perspective view of a derailleur assembly, frame, and sprockets according to a first embodiment of the disclosure, FIG. 2 is another perspective view of FIG. 1, FIG. 3 is an exploded view of FIG. 2, and FIGS. 4 and 5 are exploded view of the derailleur assembly of the first embodiment.

The embodiment provides a derailleur assembly 1 that is configured to be disposed on a frame 8 and located near a group of sprockets 9 and is able to selectively shift a bicycle chain (not shown) from one sprocket 9 to another through a chain guide 25. The frame 8 can be considered as the bicycle frame or part of the bicycle frame, and the sprockets 9 are installed on the bicycle wheel (not shown) and are wheels with teeth and in different diameters. However, the disclosure is not limited by the configuration of the frame 8 and the sprockets 9.

The derailleur assembly 1 includes a base member 10, a movable member 20, a chain guide 25, a driving module 30, a power module 40, and a cable 50.

The base member 10 has a mounting part 100 configured to be pivotably mounted on the frame 8.

The chain guide 25 is fixed to the movable member 20 and is configured to guide the bicycle chain. The chain guide 25 includes a first chain guide plate 251, a second chain guide plate 252, a first guide pulley 253, and a second guide pulley 254. The first guide pulley 253 and the second guide pulley 254 are pivotably disposed on and located between the first chain guide plate 251 and the second chain guide plate 252. The first chain guide plate 251 is fixed to the movable member 20. The second guide pulley 254 is located closer to the movable member 20 than the first guide pulley 253.

The driving module 30 includes a casing 310, a motor 320, and a transmission mechanism 330. The casing 310 is pivotably disposed on the base member 10 and the movable member 20 respectively via a first pivot shaft 91 and a second pivot shaft 92. As shown in FIG. 5, the motor 320 and the transmission mechanism 330 are both disposed in the casing 310. The transmission mechanism 330 includes a worm screw 331 and a worm wheel 332. The worm screw 331 is disposed on the motor 320. The worm wheel 332 is disposed on the second pivot shaft 92. The worm screw 331 is engaged with the worm wheel 332 in order to rotate the worm wheel 332. The transmission mechanism 330 is able to reduce the speed by using the gear ratio of the worm screw 331 to the worm wheel 332. In addition, the transmission mechanism 330 is able to be self-locked by adjusting the angles of the worm screw 331 and/or worm wheel 332; that is, the worm screw 331 is able to rotate the worm wheel 332, but the worm wheel 332 is not allowed to pivot the worm screw 331. As a result, as the second pivot shaft 92 is unwantedly pivoted to force the worm wheel 332 to pivot, the worm wheel 332 will not successfully move the motor 320.

Further, even the worm screw 331 is pivoted by the worm wheel 332, the reduced speed feature of the transmission mechanism 330 is able to suppress the movement of the worm screw 331 so as to prevent the motor 320 from being damaged.

Therefore, the motor 320 is able to pivot the second pivot shaft 92 through the transmission mechanism 330. The second pivot shaft 92 is fixed to the movable member 20. But the transmission mechanism 330 is optional; for example, in some other embodiments, the driving module may not have the transmission mechanism 330, in such a case, the motor 320 may be directly connected to the second pivot shaft 92 for driving the second pivot shaft 92.

The power module 40 can provide electricity to the driving module 30. The power module 40 includes a base body 410 and a battery assembly 420. The base body 410 is pivotably disposed on another part of the base member 10 and another part of the movable member 20 respectively via a third pivot shaft 93 and a fourth pivot shaft 94, such that the base member 10, the movable member 20, the casing 310 of the driving module 30, and the base body 410 of the power module 40 together form a four-linkage mechanism. The four-linkage mechanism can be simply called 'linkage mechanism' below. In addition, as shown in FIG. 2, the driving module 30 is located between the sprockets 9 and the power module 40, and the driving module 30 is located closer to the sprockets 9 (or the frame 8) than the power module 40, such that the casing 310 of the driving module 30 can be considered as an inner linkage member of the linkage mechanism, and the base body 410 of the power module 40 can be considered as the outer linkage member of the linkage mechanism. As such, the amount of the components of the derailleur assembly 1 is reduced and thus making the derailleur assembly 1 lightweight.

In addition, the casing 310 and the base body 410 are easier to be detached than the base member 10 and the movable member 20 since the casing 310 and the base body 410 are inner and outer linkage members. And the driving module 30 and the power module 40 are allowed to be individually detached from the derailleur assembly 1 since the base member 10 and the movable member 20 are fixed in place via both the casing 310 and the base body 410. In detail, the driving module 30 can be detached by removing the first pivot shaft 91 and the second pivot shaft 92, and the removal of which is easy and time-saving. In contrast, to the conventional rear derailleur with motor assembled on the base member or movable member, the removal of the motor is more complicated and troublesome.

The base body 410 of the power module 40 has a first electrical contact portion 411, a slot 412, a first hook 413 opposite the slot 412. The battery assembly 420 includes a battery casing 421, a battery 422, a protrusion 423, a second hook 424, and a spring 425. The battery casing 421 is disposed on a side of the base body 410 facing away from the driving module 30. The battery 422 is accommodated in the battery casing 421, and the battery 422 has a second electrical contact portion 4221. The battery 422 is electrically connected to the first electrical contact portion 411 of the base body 410 via the second electrical contact portion 4221. The protrusion 423 protrudes from the battery casing 421 and is detachably inserted into the slot 412 of the base body 410. The second hook 424 is disposed on a side of the battery casing 421 opposite the protrusion 423, and the second hook 424 is switchable between an engaged position and a disengaged position. When the second hook 424 is in the engaged position, the second hook 424 is engaged with the first hook 413 so as to fix the battery casing 421 to the base body 410. When the second hook 424 is in the disengaged position, the second hook 424 is disengaged from the first hook 413 so that the protrusion 423 is allowed to be removed from the slot 412 and the battery casing 421 is allowed to be detached from the base body 410. Two opposite ends of the spring 425 are respectively connected to the second hook 424 and the battery casing 421 so that the spring 425 constantly forces the second hook 424 to move toward the engaged position.

Due to the above engagement structures between the base body 410 and the battery assembly 420, the battery casing 421 is detachably mounted on the base body 410 and thus making the installation and removal of the battery 422 easier. In detail, the user or maintenance personnel only needs to push the second hook 424 toward the battery casing 421 to disengage the second hook 424 from the first hook 413, the battery casing 421 is then able to be removed and the user is then allowed to reach the battery 422. But the configurations of the second hook 424 and the first hook 413 are not restricted, any engagement structure that enables the battery casing 421 to be detachably fixed on the base body 410 falls within the scope of the disclosure. Further, the disclosure is not limited by how the battery casing 421 is connected to the base body 410; for example, in some other embodiments, the battery casing may be not detachably fixed on the base body.

One end of the cable 50 is electrically connected to the first electrical contact portion 411 of the base body 410, and another end of the cable 50 is electrically connected to the motor 320.

As discussed above, as the motor 320 of the driving module 30 receives electric signal, the battery 422 provides electricity to activate the motor 320 through the cable 50, and then the motor 320 starts to pivot the second pivot shaft 92 through the worm screw 331 and the worm wheel 332, such that the movable member 20 fixed on the second pivot shaft 92 is forced to pivot relative to the casing 310. Meanwhile, the chain guide 25 fixed on the movable member 20 is moved relative to the base member 10 and thus starting to shift the bicycle chain from one sprocket 9 to another.

In this embodiment, the worm wheel 332 of the transmission mechanism 330 is disposed on the second pivot shaft 92 and is able to pivot the second pivot shaft 92 as being driven by the motor 320, but the disclosure is not limited thereto. In some other embodiments, the worm wheel may be disposed on the first pivot shaft, and the worm wheel may drive the first pivot shaft to pivot when the motor pivots the worm screw. As such, the base member fixed to the first pivot shaft is forced to pivot relative to the casing of the driving module; that is, due to the four-linkage mechanism, the movable member is movable relative to the base member.

In this embodiment, the driving module 30 is located between the sprockets 9 and the power module 40, such that the casing 310 of the driving module 30 is considered as the inner linkage member of the linkage mechanism, and the base body 410 of the power module 40 is considered as the outer linkage member of the linkage mechanism, but the disclosure is not limited thereto.

Figure 6:
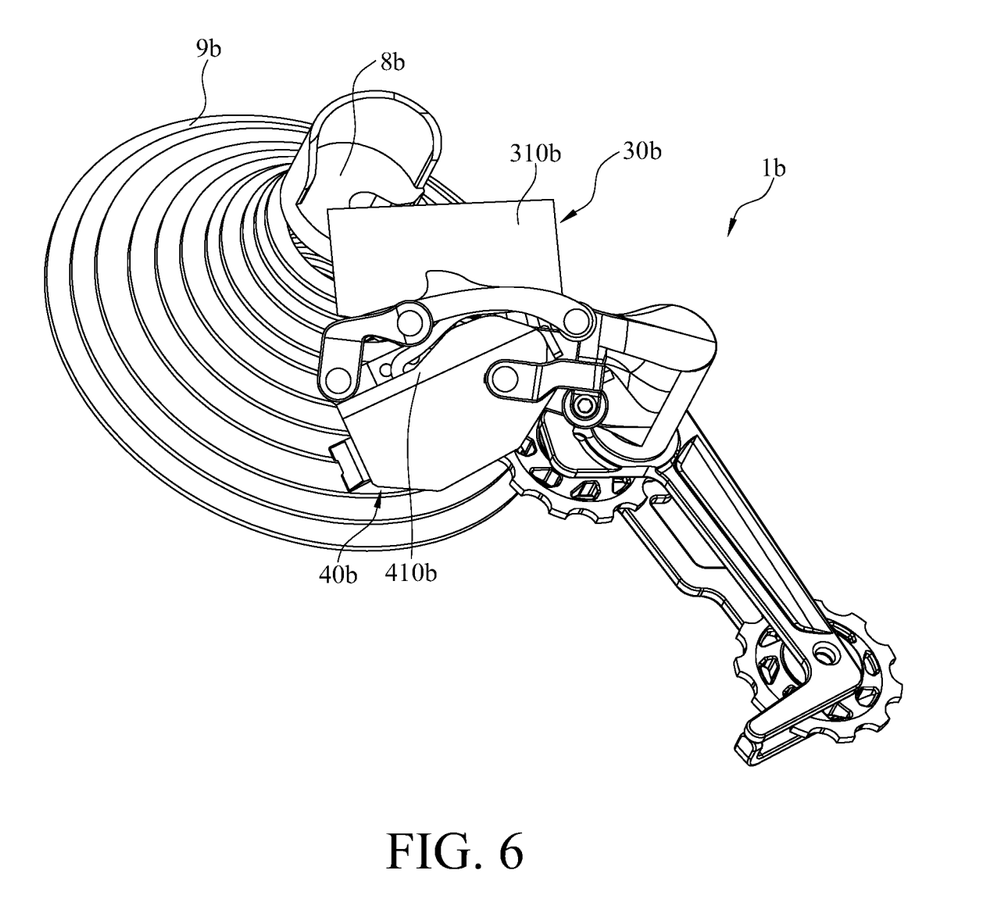
FIG. 6 is a perspective view of a derailleur assembly, frame, and sprockets according to a second embodiment of the disclosure.

For example, please refer to FIG. 6, FIG. 6 is a perspective view of a derailleur assembly, frame, and sprockets according to a second embodiment of the disclosure.

In this embodiment, a power module 40b of a derailleur assembly 1b is located between the sprockets 9b (or a frame 8b) and a driving module 30b; in such a case, a casing 310b of the driving module 30b is considered as the outer linkage member of the linkage mechanism, and a base body 410b of the power module 40b is considered as the inner linkage member of the linkage mechanism. Similarly, the configuration of the derailleur assembly 1b also has a reduced amount of components and the feature of lightweight.

According to the derailleur assembly, the base member, the movable member, the casing of the driving module, and the base body of the power module together form a four-linkage mechanism, and the casing of the driving module and the base body of the power module are two of the linkage members of the linkage mechanism. Therefore, this configuration achieves a reduced amount of components of the derailleur assembly so as to reduce the overall volume of the derailleur assembly, thereby making the derailleur assembly lightweight.

In addition, since the power module is disposed on the derailleur assembly, the distance of electricity transmission is largely reduced and thus decreasing the effect on the electricity transmission and preventing the cable from being accidentally pulled or tangled with external object.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A derailleur assembly, comprising:
   a base member;
   a movable member;
   a driving module, comprising a casing and a motor, wherein the casing is pivotably disposed on the base member via a first pivot shaft, the casing is pivotably disposed on the movable member via a second pivot shaft, and the motor is disposed in the casing; and
   a power module, comprising a base body and a battery assembly, wherein the base body is pivotably disposed on the base member via a third pivot shaft, the base body is pivotably disposed on the movable member via a fourth pivot shaft, and the battery assembly is disposed on the base body and is electrically connected to the motor.

2. The derailleur assembly according to claim 1, wherein the base member has a mounting part configured to be pivotably disposed on a frame near a plurality of sprockets; when the mounting part of the base member is disposed on the frame, the driving module is located between the plurality of sprockets and the power module.

3. The derailleur assembly according to claim 1, wherein the base member has a mounting part configured to be pivotably disposed on a frame near a plurality of sprockets; when the mounting part of the base member is disposed on the frame, and the power module is located between the sprockets and the driving module.

4. The derailleur assembly according to claim 1, wherein the battery assembly is located at a side of the base body facing away from the driving module.

5. The derailleur assembly according to claim 1, further comprising a cable, wherein one end of the cable is electrically connected to the battery assembly, and another end of the cable is electrically connected to the motor.

6. The derailleur assembly according to claim 1, wherein the battery assembly further comprises a battery casing and a battery, the battery casing is detachably mounted on the base body, the battery is accommodated in the battery casing and is electrically connected to the motor.

7. The derailleur assembly according to claim 6, further comprising a cable, wherein the base body has a first electrical contact portion, the battery has a second electrical contact portion, one end of the cable is electrically connected to the first electrical contact portion, another end of the cable is electrically connected to the motor, and the battery is electrically connected to the first electrical contact portion via the second electrical contact portion.

8. The derailleur assembly according to claim 6, wherein the base body has a first hook, the battery assembly further comprises a second hook and a spring, the second hook is disposed on the battery casing and switchable between an engaged position and a disengaged position; when the second hook is in the engaged position, the second hook is engaged with the first hook; when the second hook is in the disengaged position, the second hook is disengaged from the first hook; two opposite ends of the spring are respectively connected to the second hook and the battery casing so as to constantly force the second hook to move toward the engaged position.

9. The derailleur assembly according to claim 1, wherein the driving module further comprises a transmission mechanism disposed in the casing, the transmission mechanism comprises a worm screw and a worm wheel, the worm screw is disposed on the motor, the worm wheel is disposed on the first pivot shaft or the second pivot shaft, the worm screw is engaged with the worm wheel, and the worm screw is configured to pivot the worm wheel.

* * * * *